G. P. BOSWORTH.
KNITTING MACHINE.
APPLICATION FILED JUNE 29, 1915.

1,209,256.

Patented Dec. 19, 1916.
5 SHEETS—SHEET 1.

Inventor:
George P. Bosworth,
by Spear, Middleton, Donaldson & Spear
Attys.

Inventor:
George P. Bosworth,

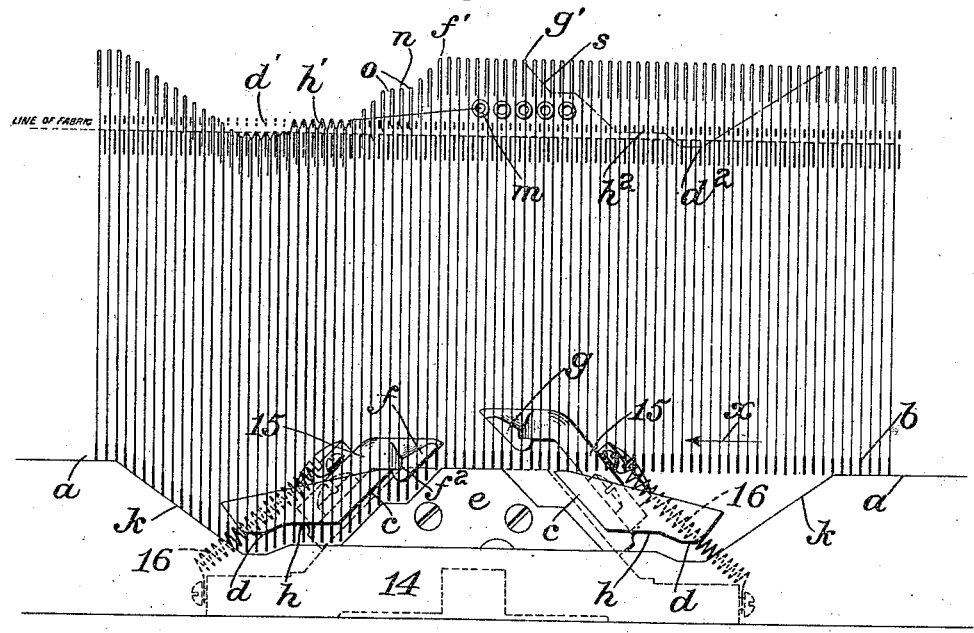
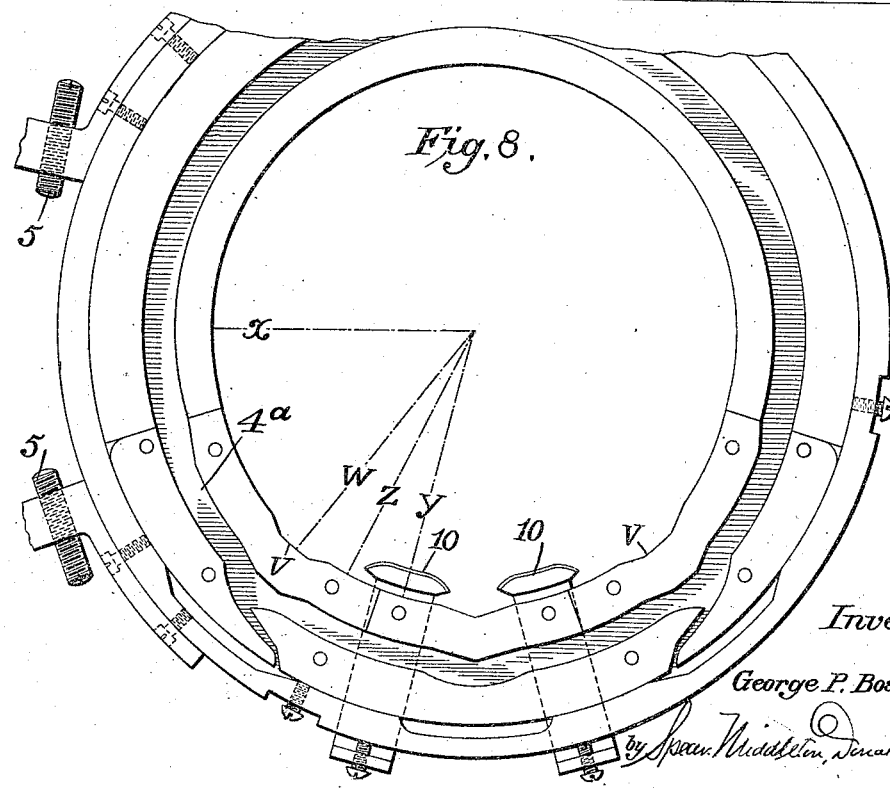

G. P. BOSWORTH.
KNITTING MACHINE.
APPLICATION FILED JUNE 29, 1915.

1,209,256.

Patented Dec. 19, 1916.
5 SHEETS—SHEET 5.

Inventor:
George P. Bosworth,
by Spear, Middleton, Donaldson & Spear
Attys

UNITED STATES PATENT OFFICE.

GEORGE P. BOSWORTH, OF CENTRAL FALLS, RHODE ISLAND, ASSIGNOR TO HEMPHILL MANUFACTURING CO., A CORPORATION OF RHODE ISLAND.

KNITTING-MACHINE.

1,209,256.  Specification of Letters Patent.  Patented Dec. 19, 1916.

Application filed June 29, 1915. Serial No. 37,022.

*To all whom it may concern:*

Be it known that I, GEORGE P. BOSWORTH, citizen of the United States, residing at Central Falls, Rhode Island, have invented certain new and useful Improvements in Knitting-Machines, of which the following is a specification.

The invention consists in the features and combination and arrangement of parts hereinafter described and particularly pointed out in the appended claims.

In the drawings Figure 1 is a sectional view of a needle cylinder showing a part of my improvements. Fig. 2 is a detail view of a needle presser, web holder and their beds and a part of the needle cylinder, the needle being pressed; Fig. 3 is a view like Fig. 2 with the web holder partly retracted and the needle also partly retracted, the new loop length being measured off over the top of the web holder. The presser is also retracted in this view. Fig. 4 is a view like Figs. 2 and 3 with the web holder retracted and the new loop drawn into the fabric; Fig. 5 is a view of part of the needle bed and web holder bed in section, and the ring which supports the pressers, illustrated as having been removed from its place between the cylinder and web holder bed, some of the pressers being shown in place in the said ring. Fig. 6 is a perspective view in section of a portion of the web holder bed; Fig. 7 is a perspective view in section of part of the presser carrying ring; Fig. 7ª is a detail sectional view of the said ring; Fig. 8 is a bottom plan view of the web holder cam ring and associated parts; Fig. 9 is a diagram of the needle wave and showing in front view the needle cams and narrowing picks; Fig. 10 is a plan view of the cam block and combined needle cams and picks of Fig. 9; Fig. 11 is a view similar to Fig. 9 of a modification; Fig. 12 is a plan view of the knitting head with parts broken away.
Figs. 13 to 16 illustrate an improvement in the stitch ring.

In the drawings, 1 indicates the needle cylinder grooved externally, and having fixed thereto to rotate therewith a bed 2 for the pressers 3 and for web holders 4. The web holders slide radially and are operated by the cam 4ª shown in Fig. 8, which, as in the well known Banner machine, is substantially fixed in relation to the needle cylinder, having only a limited rotary or shifting movement to accord with the shifting of the point at which the stitches are formed in heel and toe work, said cam being held after this limited shifting movement has taken place by the stops 5 coming against a fixed part of the frame 6, Fig. 12. The web holder bed 2 and presser support or cage 8 rotate with the needle cylinder, the web holder bed being fixed thereto by screws as 9.

The pressers 3 are mounted to have pivotal movement in a direction radially of the needle cylinder, and in carrying out this part of my invention I provide a fulcrum ring or cage 8 mentioned above, in which the said pressers are mounted and which affords means for securing accurate movements of the pressers and which present other advantages as will be hereinafter noted.

The pressers are formed with depending stem portions and upper head portions 3ᵇ, the latter extending inwardly from the stem portions and presenting proper edge faces to receive and press the needle beards. The head portions of the pressers are beveled at top and bottom to prevent the beards from striking a surface at right angles to their line of movement, which would cause breakage of the beards and preferably the upper inclined face, and the inner faces of the pressers are grooved as indicated in dotted lines at 3ª to better control the beards though the invention is not limited in this respect. The pressers are also shouldered at 3ᵇ, leaving the back of the head in proper relation to be engaged by the presser cam 10 adjustably secured at 11 to the relatively fixed cam ring 4ª above mentioned. The bed for the web holders is recessed at 12 to receive the cage 8 which carries the series of pressers and furnishes the fulcrum therefor, said cage resting on the ledge 12' of the bed at the bottom of the recess. The cage is of special formation and is adapted to carry as a body the whole series of pressers so that these pressers can be assembled in the cage while the same is apart from its seat in the bed 2, and then it, together with the whole series of pressers mounted thereon, can be inserted into the recess so that the whole series of pressers are made to assume proper position in relation to the needles and web holders, or the whole series of pressers can be removed as one body by taking the cage out from the recess in the bed, and in placing it or removing it it is only necessary to slip it down into position in the recess or lift it out therefrom. This cage consists of a ring having a solid or intact portion and a slotted portion 8ᵃ in the slots of which the pressers 3 are held by a string band 3ᶜ surrounding the cage and fitting in notches of the pressers near their lower portions, the cage along its slotted wall being grooved as at 8' to receive said spring band. The slotted portion of the cage extends up above the solid ring portion and affords lateral support for the pressers and guidance at the upper portions of their stems. The upper edge of the solid ring portion affords an edge 8ᶜ which serves as a fulcrum point on which the inner face of the stem of the presser bears and about which it turns, when operated in one direction by the presser cam 10, i. e., inwardly for pressing or outwardly under the action of the spring band. When the presser is in retracted position shown in Figs. 1, 3, 4 and 5, the inner edge of the stem bears on the outer face of the intact ring or body portion 8 of the cage, being held in this position by the spring band 3ᶜ. The stem of the presser tapers downwardly, and there is sufficient space between its outer edge and the inner wall of the recess to allow this stem to move outwardly when the head portion of the presser is moved inwardly by the cam. The recess is of proper size also to accommodate the spring band.

The cage needs no means for holding it in position, it simply resting on the ledge by its own weight and frictional contact with the wall of the recess in the bed 2, all pressures being downward. Of course in lifting the cage out or placing it in, the cam ring 4ᵃ would first have to be removed and the web holders would also be removed. The pressers are held against circumferential displacement by web holders with which they are interspaced. The needles, however, would not be disturbed. The pressers as a series can be lifted out and shifted to occupy different positions circumferentially in respect to the needles.

The web holders slide in radial grooves in the bed 2, and in grooves in the ring 13 held on top of the needle cylinder. Any presser may be removed and replaced without disturbing the cage, this being done by simply exerting pressure upwardly on the desired presser by a pair of pliers grasping the head portion, the spring band yielding for this purpose, or any presser may be thrust down into position individually, its lower end being beveled and the spring band yielding for this action.

Figure 1:
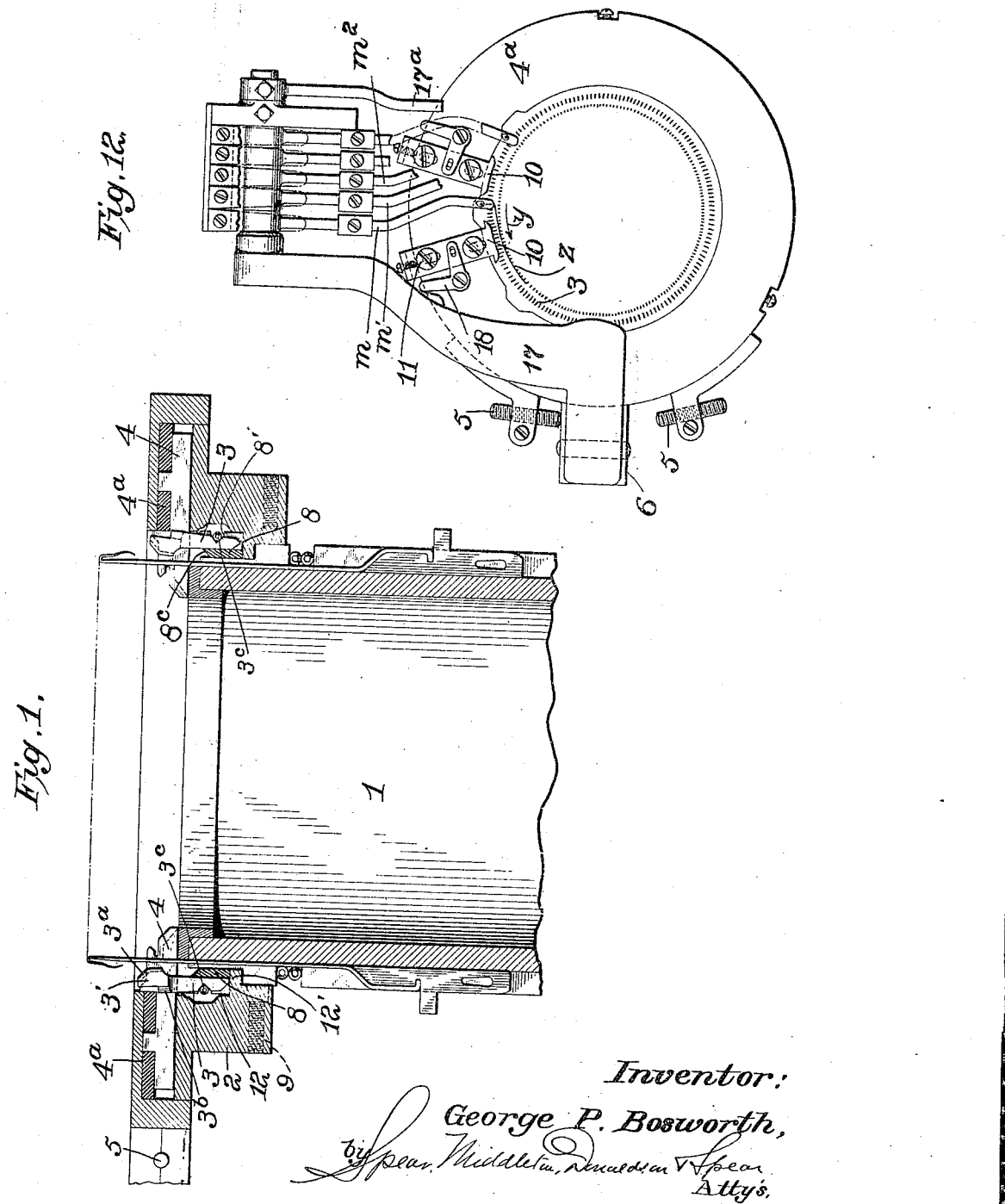
Fig. 1 represents the position of the parts at the point X, Fig. 8, the needle having advanced to take the yarn, the web holder being forward and the presser back.
Figure 2:
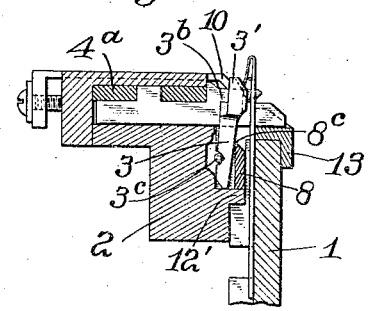
Fig. 2 represents the position of the parts when at the radial line Y, the beard being pressed and the web holder being partly retracted.
Figure 3:
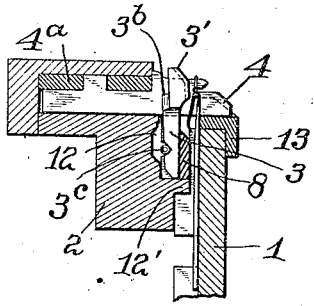
Fig. 3 is a veiw of the parts when at the radial line Z, Fig. 8, the web holder being in the same position as in Fig. 2, and the measuring of the new loops taking place across the tops of the web holders.
Figure 4:
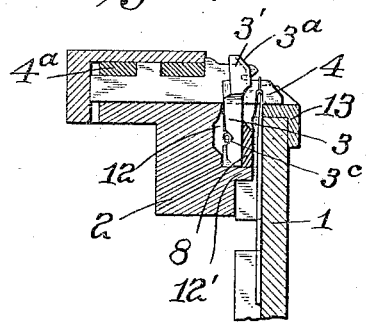
Figure 5:
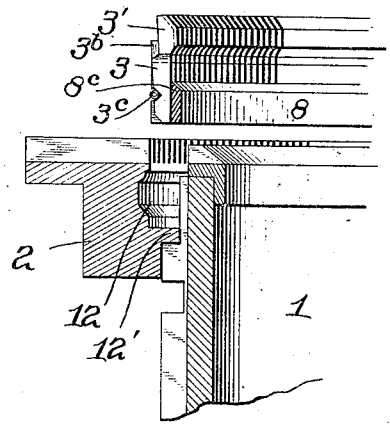
Figure 6:
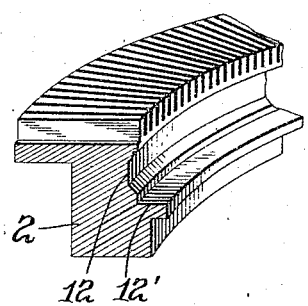
Figures 7, 7A:
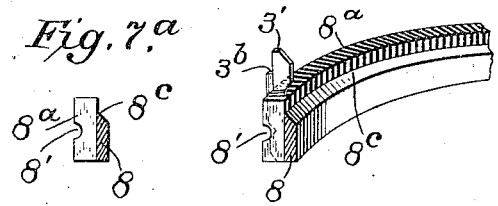
Figure 10:
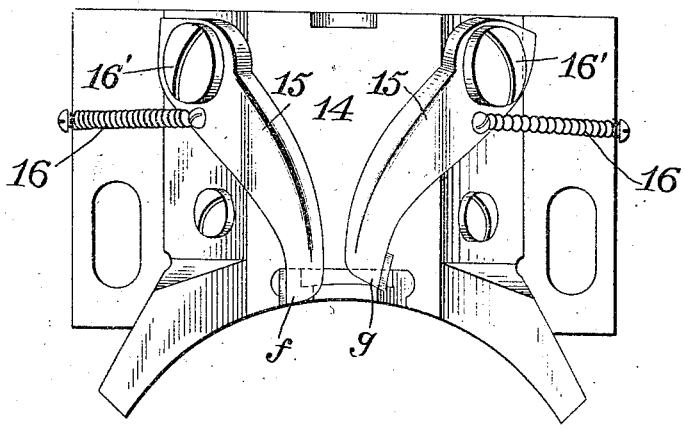

Fig. 4 represents the position of the parts when at the radial line W, the measured loop having been drawn into the fabric. The cam for the web holders is concentric at the upper portion of Fig. 8, and its lower part in said figure is generally slightly eccentric. By this the web holders are partly withdrawn ready to drop off the loop by a slight farther backward movement when the retracing cam V is reached, thus avoiding the use of a steep cam for retracting the web holder.

*Needle cams.*—In a spring needle machine employing direct feeding of the yarn to the needles, it is necessary to lay the yarn well under the needle beards and close to the needle stems and while this presents no serious problem in connection with round and round knitting, difficulties have to be met when direct feeding to spring beard needles is employed in connection with a stocking machine in which the needle cylinder oscillates at the time of making the heel and toe and the knitting point shifts from one side of the yarn feeding point to the other. In a latch needle machine of the Banner type, a group of cams is employed for the needles including a pair of retracting cams, stitch cams, and a central guard cam for lowering the needles slightly so as to avoid striking the point of the retracting cam and also so that the needle will be directed to the incline leading to the stitch point. This guard cam, in the well known Banner machine, being centrally located, begins its lowering action on the latch needles before they reach the center line, or in other words, before they come opposite the yarn feed, which, of course, for heel and toe work is located at the center line of the cam set. In carrying out this part of my invention for spring needle knitting I have modified the cam set of the Banner machine so that the knitting wave, instead of beginning at a point on the side approaching the center line of the cam set or the position of the yarn feed finger, will not begin until the needles have passed well beyond the center line of the cam set and therefore beyond the point where the yarn leaves the feed finger, so that the beards of the needles will be well over the yarn before they begin to descend to take it. Further, in carrying out this part of my invention I have aimed to adhere as closely as practical to the general form of the Banner needle cam set, and also the pick arrangement, though it will be understood that I do not limit myself in this respect as to the broader aspects of the invention, and as exemplifying the fact that the invention may be carried out in different ways I have shown two forms of cam sets in Figs. 9 and 11.

In Fig. 9 I show the normal cam surface at $a$ with the butts of the needles also indicated at $b$. When the needles are resting on this cam surface the needles are at their normal plane. The cams for retracting the needles are shown at $c$, and the stitch cams or stitch points at $d$. Also a central guard cam is employed at $e$ below the path of the needle butts. Instead of employing the upper central V-shaped cam of the Banner set acting as a guard cam to initiate the lowering of the needles to direct them properly to the retracting cam surfaces $c$, I use as shown in Fig. 9 cam means made up of the two shiftable members $f$, $g$. These are carried on arms 15 pivotally mounted to the inclined sides of the cam block 14 like the picks in the well known Banner type of machine, and these members, in the example of my invention now being described, constitute the narrowing picks as well as the cam members. The arms carrying these members are drawn normally downward by springs 16 into the position shown at the left of Fig. 9, in which position the arm is resting on the top of the pick block and the member $f$ is in position to perform its cam function, it being understood that the needles are passing in the direction of the arrow X, this being the direction of continuous knitting. The needles, in passing in the direction of the arrow, will pass under the right hand member $g$, which now rides on top of the needle butts, as the narrowing pick does in the Banner machine after it has been lifted by the needle in narrowing, and the needles, after passing under this cam member $g$, will pass beyond the center of the cam set, still maintaining their elevated position until the needle butt reaches the inclined under surface of the cam member $f$, when the needle will begin to retract, and will continue this movement until the lower rounded edge of this cam member is reached, when the needle butt will then move horizontally for a short space until it strikes the underside of the retracting cam $c$, whose point has been thus guarded by the cam $f$, and the retracting movement will be followed by another horizontal movement of the needle, but along the edge of the cam at $h$, after which the needle butt will be drawn down at $d$ for forming the stitch, and after this the butt will be raised to the normal plane by the restoring cam $k$. The knitting wave will thus be formed as shown at the top of Fig. 9, the needles not beginning to retract from their elevated position until they have passed in the arrow direction to the point $f'$ a considerable distance beyond the central point at which the yarn is fed by the finger $m$. At the point $n$ the needles cease retracting momentarily and at this position the beards will be lined up with the pressers, and pressing will be done at $o$, this continuing as the needle retracts farther. At $h'$ measuring of new loops over the tops of a plurality of advanced web holders takes place, the needles drawing down so that a number of them will be occupying one level and holding the measured loops, and at $d'$ the needles are drawn down to their stitch-forming limit and draw previously measured loop through the old loop supported by the lower ledge of the web holder, said web holder having retracted at this point to release the measured loops.

Now, on the reverse movement of the needle cylinder, i. e., opposite the direction of the arrow X, Fig. 9, the first needle of the heel and toe set to be lifted to inoperative position for narrowing will strike the shoulder at $f^2$ of the member $f$, which is formed like a pick, and this member will be raised and the following needles will pass beneath it as in the ordinary operation of picking for narrowing on the Banner machine. The member $g$ having fallen, however, as in ordinary practice when the direction of rotation was reversed, will now occupy a position in line with the needle butts passing under the member $f$, and will cause their retraction, as indicated by the dotted line $s$, Fig. 9, and the actions above described will be repeated, but in connection with this cam $g$ and its associated retracting cam $c$, measuring cam $h$ and stitch cam $d$, instead of those previously referred to. The starting point of the knitting wave will now have been shifted to the point $g'$, and the yarn will now be extending from the central yarn finger to the stitch point $d^2$, being measured off, however, into new loop lengths at the level $h^2$. The needles before beginning to retract will have passed well beyond the yarn finger $m$, and their beards will be located well over the yarn before the descent of the needle begins, and as the yarn is laid close against the needle stems and well under the beards, which are still up or in their elevated positions, the beards will take the yarn with certainty.

In the example described the members $f$, $g$, perform the multifold function of guarding the points of the main retracting cams similarly to the central guard cam of the Banner machine; they jointly cause the shifting of the point at which the knitting wave begins or, in other words, the point at which the needles begin to retract first to one side of and beyond the central point where the thread is fed, and then to the other side, so that the needle beards are maintained in their elevated positions until they are well over the yarn being fed in, and they also serve the purpose of narrowing picks acting as such in the way well known in the Banner machine.

Figure 11:
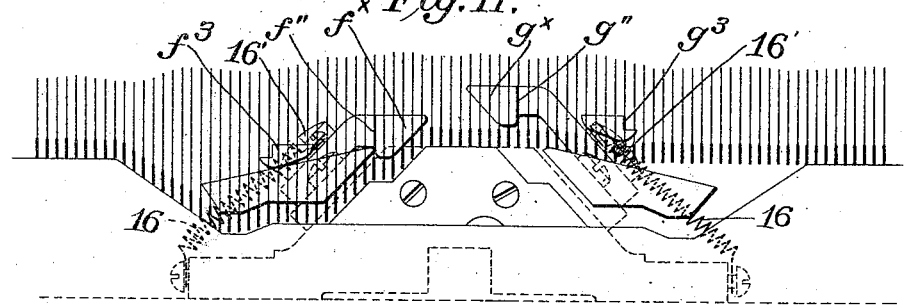
Figure 13:
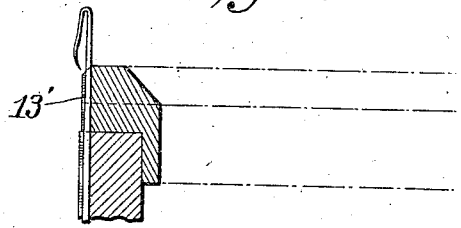
Figure 14:
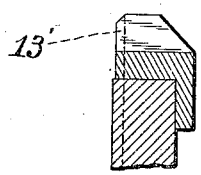
Figure 15:
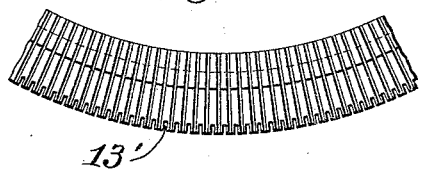
Figure 16:
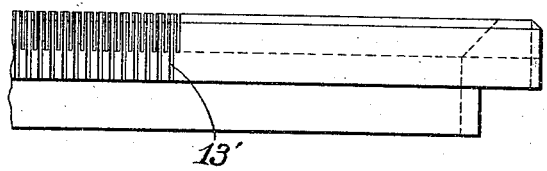

Instead of employing the members $f$ and $g$ as narrowing picks, I may use separate narrowing picks $f^3$, $g^3$, as shown in Fig. 11, and the members $f^x$, $g^x$ serve the purpose of shifting guard cams performing this function in the same way that the cam members $f$ and $g$ do, that is, they rise when struck by the needle butts to allow these butts to pass, but they do not lift any needles for narrowing, being devoid of pick shoulders, but having plain vertical faces at $f''$, $g''$. They rise like the cams $f$, $g$, when struck, because their arms are mounted on inclined pivots 16', secured to the inclined sides of the pick blocks. The picks, in this form, are mounted and operated in substantially the same way as in the Banner machine, and they may pivot around the same inclined pivots which serve for the cam members $f^x$, $g^x$. The picks, however, may be otherwise disposed.

*Control of pressers.*—I have provided a presser cam mechanism which will be automatically adjustable to set the presser cams in and out at proper times. When they are out of work the presser cams are retracted or moved outwardly away from the circle of pressers, and in this position the yarn, as it shifts from one side of the yarn finger to the other in heel and toe work, will not be caught by the presser, and thus interfere with the proper taking up of the yarn. The presser cams are moved in and out in alternation.

Referring to Fig. 12, the presser cam 10 at the left is in its innermost position ready to perform its function of operating the pressers inwardly, and the circle of pressers is indicated at 3. The presser cam at the right is in its outermost position. The direction of rotation of the needle circle is indicated by the arrow $y$. Now, when the direction of rotation is reversed, the cam ring upon which the presser cams are mounted is moved for a limited distance in the direction opposite to the arrow, and until the stop 5 (lower one) strikes against the fixed post 6$^x$ to which the arm 17 supporting the yarn feed fingers $m$, $m'$, etc., are pivoted. This oscillation of the cam ring is usual in the Banner machine to properly position or get the lead of the web holder cams in relation to the stitch point. As soon as this reverse movement of the cam ring begins to take place, the presser cam 10 at the left begins to move outwardly due to the spring band exerting its force through the pressers, and due to centrifugal force, and due also to the fact that the controlling lever 18 of the presser cam moves away from the surface of the bracket 17 or other part with which it contacted to move it to operative position. Therefore this presser cam will be at once retracted and will be out of the way of the strand of the yarn at $z$ extending from the fabric to the central yarn finger $m$. At the same time the lever of the right hand presser cam will be brought against the arm 17$^a$, and this presser cam will be moved inwardly to operative position to work against the pivoted pressers. From this arrangement also it will be seen that when the bracket 17 is lifted for any reason, and the yarn is withdrawn from work, both the presser cams will be free to move outwardly under the action of the spring band acting through the pressers, and because of this there will be no danger of the work being pressed off from the needles should the machine be turned when the yarn finger bracket is lifted.

The invention in some aspects is not restricted to machines of the spring needle type.

Referring to the guard cams $f$ and $g$, these in effect, constitute upper guard cam means formed in sections, each being individually movable under the action of the needle butts to be raised to inoperative position and to allow the needle butts to pass, and after passing the center of the cam set to be initially retracted by that section of the guard cam means which lies on the far side of the center of the cam set in respect to the direction of rotation of the needle circle. By this sectional guard cam means $f$, $g$, it will be noticed that the high points of the cam, for instance, the right hand end of the cam section $f$, Fig. 9, lies nearest to the center of the cam set, and the cam surface inclines downwardly and away from the center of the cam set, the general effect being that instead of the usual upper V-shaped guard cam employed in the Banner machine, my present form of guard cam, considering, of course, the two sections $f$ and $g$ as constituting this guard cam, is in the form of an inverted V, but the sides of the V do not reach an apex, and the inclined sides of the general V-shaped cam are not effective upon the needle butts until said butts have passed well beyond the center of the cam set.

Referring to Figs. 13 to 16, I have improved the stitch ring 13 with a view to affording lateral support for the needles, while the pressers are acting upon the beards. For this purpose the stitch ring is grooved vertically at 13' to receive the needles. The upper ends of these grooves are, of course, formed in the faces of the walls which lie between and guide the web holders, whereas the lower portions of these grooves 13' extend across the edge of the intact or solid portion of the stitch ring. By this grooved construction the needle is supported close to its upper end against lateral displacement, and thereby certainty of proper pressing is secured.

Certain features shown and described herein but not claimed, because of official requirement for division, will be claimed in another application.

I claim as my invention:

1. In combination in a circular knitting machine, a needle cylinder having rotary and reciprocating movements, a needle cam set including two stitch cams, with retracting portions, restoring cams, and guard cam means to initiate the retraction of the needles by engaging the needle butts, said guard cam means being formed in two sections, said sections being located on opposite sides of the center of the cam set, and both sections being movable to be lifted by the needle butts, said needle butts passing the cam on the near side of the cam set in respect to the direction of rotation of the needle circle, and passing beyond the center of the cam set to be retracted by the other section of the guard cam means after having passed beyond said center of the cam set, substantially as described.

2. In combination in a stocking knitting machine, a needle cylinder having rotary and reciprocating movements, a cam set including a pair of stitch cams with retracting cam portions, a lower central guard cam, and upper guard cam means formed in sections, said sections being located on opposite sides of the center of the cam set, and each section being pivotally mounted to be raised under the impact of the needle butts, said needle butts raising the cam section on the near side of the cam set in respect to the direction of rotation of the needle circle, and thence passing below said raised section and beyond the center of the cam set before striking the inclined side of the other section of the guard cam means which initiates the retraction of the needles to direct them to the main retracting cam only after the needles have passed beyond the center of the cam set, substantially as described.

3. In combination in a stocking knitting machine, a needle cylinder having rotary reciprocating movements, a cam set for operating the needles for both round and round and reciprocating knitting, including a pair of stitch cams with retracting cam portions, guard cam means comprising two sections or members movable vertically to overlie the needle butts or to engage and retract the needle butts with the needles to direct them to the main retracting cam, said guard cam sections being located on opposite sides of the center of the cam set, and each section acting to initiate the retraction of the needles only after the said needles have passed the center of the cam set, and pick means for engaging the needle butts, substantially as described.

4. In combination in a stocking knitting machine, a needle cylinder having rotary reciprocating movements, a cam set for operating the needles for both round and round and reciprocating knitting, including a pair of stitch cams, with retracting cam portions, guard cam means comprising two sections or members movable vertically to overlie the needle butts or to engage and retract the needle butts with the needles to direct them to the main retracting cam, said guard cam sections being located on opposite sides of the center of the cam set, and each section acting to initiate the retraction of the needles only after the said needles have passed the center of the cam set, and pick means for engaging the needle butts, said pick means being associated with the sections of the guard cam, substantially as described.

5. In combination in a stocking knitting machine, a needle cylinder having rotary reciprocating movements, a cam set for operating the needles for both round and round and reciprocating knitting, including a pair of stitch cams, with retracting cam portions, guard cam means comprising two sections or members movable vertically to overlie the needle butts or to engage and retract the needle butts with the needles to direct them to the main retracting cam, said guard cam sections being located on opposite sides of the center of the cam set, and each section acting to initiate the retraction of the needles only after the said needles have passed the center of the cam set, and pick means for engaging the needle butts, said pick means being carried by the sections of the guard cam means, substantially as described.

6. In combination in a stocking knitting machine, a needle cylinder having rotary and reciprocating movements, a set of cams for operating needles on both movements, including a pair of stitch cams, with retracting cam portions and a pair of restoring cams, and an upper guard cam means consisting of two sections, said sections being located on opposite sides of the center of the set of cams, and each inclining from an upper high point downwardly and away from the center of the set of cams, each of said sections being movable to allow the needle butts to pass and being raised by contact of said needle butts therewith, each of said sections initiating the retraction of the needles by engaging the butts thereof after said needles have passed the center of the cam set, said sections acting alternately, substantially as described.

7. In combination in a spring needle stocking machine, a cylinder carrying spring beard needles, means for feeding the yarn for heel and toe work directly to the needle stems below the beards and without sinking the yarn between said needles, and cam means for operating the spring beard needles, said cam means initiating the retraction of the needles to take the yarn only after said spring beard needles have passed beyond the yarn feed, said cam means comprising a pair of retracting cams, one for each direction of knitting, having stitch points, and a sectional upper guard cam the sections of which are movable, and which act alternately for retracting the needles in reciprocating work after said needles have passed the yarn feed point, substantially as described.

8. In combination in a spring needle stocking machine, a cylinder carrying spring beard needles, means for feeding the yarn for heel and toe work, and cam means for operating the spring beard needles, said cam means initiating the retraction of the needles to take the yarn only after said needles have passed beyond the yarn feed, said cam means comprising a pair of retracting cams, one for each direction of knitting, and having stitch points, and a sectional upper guard cam, the sections of which are movable, and which act alternately for retracting the needles in reciprocating work after said needles have passed the yarn feed point, the sections of said guard cam being moved to inoperative position above the line of the needle butts by said needle butts acting upon said sections, substantially as described.

9. In combination in a circular stocking knitting machine, a needle cylinder, a set of needle cams including a stitch cam on each side of the center of said cam set, and guard cam means formed in two sections, one on each side of the cam set, each of said sections being pivotally mounted and each having its inclined under face inclining downwardly and away from the center line of the cam set, each of said sections retracting the needles after said needles have passed the other cam section, said sections alternately being lifted by the needle butts as the machine reciprocates, substantially as described.

10. In combination in a circular stocking knitting machine, a needle cylinder, a set of needle cams including a stitch cam on each side of the center of said cam set, and guard cam means formed in two sections, one on each side of the cam set, each of said sections being movably mounted and each having its inclined under face inclining downwardly and away from the center line of the cam set, each of said sections retracting the needles after said needles have passed the other cam sections, said sections being moved alternately above the path of the needle butts by impact of said butts thereagainst during reciprocating knitting, substantially as described.

11. In combination in a circular stocking knitting machine, a needle cylinder, a set of needle cams including a stitch cam on each side of the center of said cam set, and guard cam means formed in two sections, one on each side of the cam set, each of said sections being movably mounted and each having its inclined under face inclining downwardly and away from the center line of the cam set, each of said sections retracting the needles after said needles have passed the other cam section, each of said cam sections having pick means mounted thereon, substantially as described.

12. In combination in a circular stocking knitting machine, spring beard needles, a needle cam set including a pair of stitch cams, a yarn feed to deliver the yarn centrally of the cam set, and guard cam means composed of two sections one on each side of the center of the cam set to retract the needles, each of said sections having its under surface for retracting the needles inclining downwardly and away from the center line of the cam set, and each being movably mounted, and raising alternately to permit the spring beard needle to be retracted by the cam sections on the far side of the cam set according to the direction of rotation, substantially as described.

13. In a knitting machine, a needle cylinder, needles and needle cams including guard cam means formed in sections, each section carrying a needle pick substantially as described.

In testimony whereof, I affix my signature in presence of two witnesses.

GEORGE P. BOSWORTH.

Witnesses:
JAMES L. JENKS,
JOHN LAWSON.